(12) United States Patent
Jandhyala et al.

(10) Patent No.: US 11,584,695 B2
(45) Date of Patent: *Feb. 21, 2023

(54) WORK METHOD TO DESIGN FOR THICKENING TIME BY TAILORING ADDITIVES

(71) Applicant: Halliburton Energy Services, Inc., Houston, TX (US)

(72) Inventors: Siva Rama Krishna Jandhyala, The Woodlands, TX (US); John Paul Bir Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 224 days.

This patent is subject to a terminal disclaimer.

(21) Appl. No.: 16/923,718

(22) Filed: Jul. 8, 2020

(65) Prior Publication Data
US 2022/0009844 A1    Jan. 13, 2022

(51) Int. Cl.
*C04B 40/00*    (2006.01)
*C04B 28/02*    (2006.01)
(Continued)

(52) U.S. Cl.
CPC .......... *C04B 40/0032* (2013.01); *C04B 28/02* (2013.01); *C04B 2103/12* (2013.01); *C04B 2103/22* (2013.01)

(58) Field of Classification Search
CPC . C04B 40/0032; C04B 28/02; C04B 2103/12; C04B 2103/22
See application file for complete search history.

(56) References Cited

U.S. PATENT DOCUMENTS 5,570,743 A * 11/1996 Padgett .................. B28C 9/004
                                                    166/295
6,009,419 A * 12/1999 Coveney ............. G01N 33/383
                                                     706/15
(Continued)

FOREIGN PATENT DOCUMENTS

CN    106437609     2/2017
WO    2018156124    8/2018
(Continued)

OTHER PUBLICATIONS

International Search Report and Written Opinion for Application No. PCT/US2020/042275, dated Apr. 7, 2021.
(Continued)

*Primary Examiner* — Crystal J. Lee
(74) *Attorney, Agent, or Firm* — Thomas Rooney; C. Tumey Law Group PLLC (57) ABSTRACT

A method of designing a cement slurry may include: (a) selecting at least a cement and concentration thereof, a water and concentration thereof, and one or more chemical additives and a concentration thereof such that a cement slurry formed from the cement, water, and the one or more chemical additives meet a density requirement; (b) calculating a thickening time of the cement slurry using a thickening time model; (c) comparing the thickening time of the cement slurry to a thickening time requirement, wherein steps (a)-(c) are repeated if the thickening time of the cement slurry does not meet or exceed the thickening time requirement, wherein the step of selecting comprises selecting concentrations and/or different chemical identities for the one or more chemical additives, cement, or water, or step (d) is performed if the thickening time of the cement slurry meets or exceeds the thickening time requirement; and (d) preparing the cement slurry.

20 Claims, 3 Drawing Sheets

(51) Int. Cl.
*C04B 103/12* (2006.01)
*C04B 103/22* (2006.01)

(56) References Cited

U.S. PATENT DOCUMENTS

| | | | |
|---|---|---|---|
| 7,631,692 B2 | 12/2009 | Roddy | |
| 8,333,240 B2 | 12/2012 | Roddy | |
| 8,609,595 B2 | 12/2013 | Morgan et al. | |
| 8,997,578 B2 | 4/2015 | Morgan et al. | |
| 10,047,270 B2 | 8/2018 | Pisklak et al. | |
| 10,294,154 B2 | 5/2019 | Morgan et al. | |
| 2010/0212892 A1* | 8/2010 | Santra | C09K 8/467 166/250.14 |
| 2017/0364607 A1* | 12/2017 | Kaushik | C09K 8/00 |
| 2019/0026167 A1 | 1/2019 | Gerweck et al. | |
| 2019/0026168 A1 | 1/2019 | Qiu et al. | |
| 2019/0026171 A1 | 1/2019 | Lea et al. | |
| 2019/0026172 A1 | 1/2019 | Wu et al. | |
| 2019/0026175 A1 | 1/2019 | Shelke et al. | |
| 2019/0026176 A1 | 1/2019 | Ganapathy et al. | |
| 2019/0026177 A1 | 1/2019 | Damron et al. | |
| 2019/0026179 A1 | 1/2019 | Araki et al. | |
| 2019/0026180 A1 | 1/2019 | Wong et al. | |
| 2019/0330513 A1 | 10/2019 | Jimenez et al. | |
| 2019/0358853 A1 | 11/2019 | Morgan et al. | |
| 2019/0367796 A1 | 12/2019 | Pisklak et al. | |
| 2019/0367797 A1 | 12/2019 | Morgan et al. | |

FOREIGN PATENT DOCUMENTS

| | | | |
|---|---|---|---|
| WO | 20180156114 | 8/2018 | |
| WO | 20180156116 | 8/2018 | |
| WO | 20180156124 | 8/2018 | |
| WO | WO-2018156123 A1 * | 8/2018 | C04B 18/08 |

OTHER PUBLICATIONS

Salam, K. K. et al., "Evaluation of Thickening Time of Oil Field Class G Cement Slurry at High Temperature and Pressure using Experimental Design", International Journal of Engineering Sciences, 2013, vol. 2, pp. 361-367.

Umeokafor, C. V., & Joel, O. F. (2010). Modeling of Cement Thickening Time at High Temperatures With Different Retarder Concentrations Nigeria Annual International Conference and Exhibition.

Bensted, J. (1991). Retardation of Cement Slurries to 250 degrees F. Offshore Europe.

* cited by examiner

WORK METHOD TO DESIGN FOR THICKENING TIME BY TAILORING ADDITIVES

BACKGROUND

In well cementing, such as well construction and remedial cementing, cement compositions are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A challenge in well cementing is the development of satisfactory properties of the cement during placement. Oftentimes several cement slurries with varying additives are tested to see if they meet the material engineering requirements for a particular well. The process of selecting the components of the cement slurry are usually done by a best guess approach by utilizing previous slurries and modifying them until a satisfactory solution is reached. The process may be time consuming and the resulting slurry may be complex. Furthermore, the cement components available in any one particular region may vary in slurry from those of another region thereby further complicating the process of selecting a correct slurry.

BRIEF DESCRIPTION OF THE DRAWINGS

These drawings illustrate certain aspects of some of the embodiments of the present disclosure and should not be used to limit or define the disclosure.

DETAILED DESCRIPTION

The present disclosure may generally relate to cementing methods and systems. More particularly, embodiments may be directed to designing cement slurries based at least partially on a thickening time model.

Cement slurries may contain cement, supplementary cementitious additives, inert materials, and chemical additives. A cement slurry for use in cementing wellbores is typically mixed at a wellbore pad site using cement mixing equipment and pumped into the wellbore using cement pumps. After the cement slurry is mixed, there is a time lag between when the cement is in a liquid state and when the cement begins to set. As the cement slurry begins to set, the slurry gradually becomes more viscous until fully set. There may be an upper limit of viscosity beyond which the cement slurry becomes too viscous to pump. In general, the upper limit of viscosity is typically defined to be when the fluid has a consistency of greater than 70 Bearden units of consistency ("Bc"). However, there may be other considerations where the cement slurry would be considered unpumpable and thus a Bc value of 30, 50, 70, 100, or any other value may be selected as being "unpumpable." To determine the consistency or Bc value of a cement slurry, an atmospheric or a pressurized consistometer may be used in accordance with the procedure for determining cement thickening times set forth in API RP Practice 10B-2, *Recommended Practice for Testing Well Cements*, First Edition, July 2005. The time to reach the selected Bearden units of consistency is reported as thickening time. It is often a design criteria for a cement slurry to have a long enough thickening time such that there is enough time to pump the required volume of cement into the wellbore while also not having too long of a thickening time where there is excessive downtime from waiting on the cement to set. The thickening time for a cement slurry may be a function of pressure, temperature, temperature ramp rate, density of the cement slurry, and composition of the cement slurry.

Designing a cement slurry to have a desired thickening time is an inefficient trial and error process often requiring multiple iterations of selecting slurry components and mass fractions thereof and testing a thickening time for a slurry formed from the slurry components. Small changes in composition may result in widely varying thickening times which is further compounded by cementitious materials varying across different geographical areas. As such, a cement recipe that is prepared in one region may have a different thickening time than the same recipe prepared in a different region with same class of materials, due to the differences in minerology and manufacturing processes of the cement components. The differences in thickening times may be difficult to predict as the thickening time of a cement slurry is a complex function of various interacting factors.

Cement slurries are typically blended with chemical additives such as accelerators, retarders, fluid loss control additives, lost circulation control additives, rheological modifiers, and other chemical additives to impart desirable properties on the cement slurry such as fluid loss control, rheology, stability, and thickening time. The additive package that can satisfy all of these properties is typically determined through an iterative process. This is because one additive used to satisfy one property may affect another property. For example, a fluid loss control additive may retard the cement slurry. Thus, when designing for thickening time, the effects of each additive on thickening time must be accounted for.

At a given temperature, a thickening time model may include two main components, a component that models thickening time of the blend of cementitious components along with inerts, and a component that models thickening time of cement additives. Equation 1 is a general model equation for thickening time where TT is the thickening time which is a function of $TT_b$ which is a component that models thickening time of the blend of cementitious components, and of $TT_a$ which is a component that models thickening time of cement additives.

$$TT = f(TT_a, TT_b) \qquad \text{Equation 1}$$

A thickening time model of the blend of cementitious components may account for pressure, temperature, ramp rate, density, and chemical composition of a cement slurry. The models thickening time of the blend of cementitious components may include two main components, the first being effects of water on thickening time and the second being effects of composition on thickening time. The first component is generally a function of the density of the cement slurry which may be controlled by varying the amount the amount of water that is added to a dry cement blend to produce the cement slurry. Further the type or source of water may affect the thickening time as dissolved ions in the water may interact with the cement components and additives. For example, a cement composition prepared with sea water may be expected to have a different thickening time than a cement composition prepared with fresh water. The second component is generally a function of the chemical identity of the components that make up the cement slurry and their corresponding mass or volume fractions in the cement slurry.

A relationship between water and thickening time may be expressed as a power law function as in equations 2 and 3. Equation 2 shows that the thickening time is proportional to the amount of water used in the preparing of the cement slurry. In equation 2, water/blend is a mass or blend volume ratio of water to the other components in the cement slurry such as Portland cement, supplementary cementitious materials and inert materials, and n is a measurement of sensitivity to change in water of the blend where n may be a constant or a function of the blend materials. In some instances, n may also be a function of the type of water. To determine n, two cement slurries at different densities may be mixed and the thickening time may be analyzed using laboratory methods. Thereafter, equation 2 or 3 may be used to calculate the value of n for the water. Equation 3 shows an alternate form of the relationship between water and thickening time as a function f comprising a polynomial. Other forms of function f may be log, exponential, power law, trigonometric, integral, differential, or combinations thereof.

$$TT \propto \left(\frac{water}{blend}\right)^n \quad \text{Equation 2}$$

$$TT \propto f\left(\frac{water}{blend} + \left(\frac{water}{blend}\right)^2 + \cdots\right) \quad \text{Equation 3}$$

A relationship between the effects of water on thickening time may be an exponential relationship as shown in equation 4. While only two forms for the effect of water on thickening time are described herein, the effect of water on thickening time may be expressed in any suitable manner such as a logarithmic model, integral model, derivative model, or any other suitable model.

$$TT \propto e^{\left(n\frac{water}{blend}\right)} \quad \text{Equation 4}$$

A relationship describing effects of composition on thickening time may be a linear combination of individual contributions from each cement component as shown in equation 5. In equation 5, $x_i$ and $x_1$ are the mass fraction of component i and j, respectively, in the cement blend and $\beta_{1i}$, $\beta_{1ij}$, $\beta_{2i}$, etc are model parameters which characterize reactivity of component i and j, or interaction between component i and j. For some components, $\beta$ may be constant, whereas for other components $\beta$ may be depended upon temperature and pressure, for example. $\beta$ for any component may be experimentally determined. One method of obtaining $\beta_i$ for a cement component may be to select a Portland cement with a known or measured thickening time measured at a reference temperature, pressure, and density. Thereafter a volume of the cement component whose $\beta_i$ is unknown may be mixed with the selected Portland cement and water to the reference density. A thickening time test may be performed at the reference temperature and pressure and equation 4 may be used to determine the $\beta_i$ value for the cement component.

$$TT \propto \sum_i x_i \beta_{1i} + \sum_i \sum_j x_i x_j \beta_{1ij} + \sum_i x_i^2 \beta_{2i} \cdots \quad \text{Equation 5}$$

An alternate form of a relationship describing effects of composition and additives on thickening time may be a relationship as shown in equation 6 where $TT_b$ is contribution of thickening time of blend which may be a function of the bulk bend composition, mass fraction of water in the cement slurry, as well as temperature and pressure. In examples where the bulk blend composition is pure cement without additional supplemental cementitious materials, or inert materials, then $TT_b$ is the contribution of compressive strength from the cement alone. $TT_a$ is contribution of thickening time of additives which may be a function of mass fraction of additives as well as temperature and pressure.

$$TT \propto TT_b * TT_a \quad \text{Equation 6}$$

A thickening time model of cement additives ($TT_a$) may account for whether the additive has a tendency to accelerate or retard the cement hydration or both, whether the effect of the additive on thickening time is temperature dependent, whether are interactions between additives, and interactions between additives and the cement blend materials. A generalized relationship between the effects of additives on thickening time is shown in equation 7 where $f_c$ is a function and C is a concentration of an additive. In some examples, $f_c$ may comprise a polynomial, log, exponential, power law, trigonometric, integral, differential, or combinations thereof A thickening time model with additives and blend is shown in equation 8.

$$TT_a \propto f_c(C) \quad \text{Equation 7}$$

$$TT = TT_b f_c(C) \quad \text{Equation 8}$$

One form of $f_c$ may be expressed as an exponential as in equation 9. In equation 9, $\gamma$ is a measure of potency of an additive to accelerate or retard the cement hydration process and c is the concentration of the additive, typically expressed with reference to a base material such as cement such as by weight of cement (bwoc), or as a mass fraction or volume fraction. The potency of the additive $\gamma$, is typically a function of temperature, pressure as well as the concentration of the additive. For an additive that retards, $\gamma$ will be positive and for an additive that accelerates $\gamma$ will be negative.

$$TT_a \propto e^{\gamma c} \quad \text{Equation 9}$$

A relationship between the effects of additives on thickening time may be expressed as power law as in equation 10. In equation 10, c is the concentration of the additive and a is a constant where a is positive for retarders and a is negative for accelerators.

$$TT_a \propto (C)^a \quad \text{Equation 10}$$

A relationship between the effects of additives on thickening time may be expressed as an exponential in equation 11 and 12. In equations 11 and 12, T is temperature, E is activation energy, c is the concentration of the additive, and $\gamma_0$ is a potency at a reference temperature. The activation energy E captures the effect of temperature on additive. In equation 13, the term S(T) is a sigmoid function with temperature and equation 13 is one form of a sigmoid function and equation 14 shows one form of a sigmoid function.

$$TT_a \propto e^{(\gamma_0 + \frac{E}{T}) \times c} \qquad \text{Equation 11}$$

$$TT_a \propto e^{(\gamma_0 + ET) \times c} \qquad \text{Equation 12}$$

$$TT_a \propto e^{(\gamma_0 + \gamma_1 * S(T)) \times c} \qquad \text{Equation 13}$$

$$S(T) = \frac{1}{1 + e^{(T-T_0) \times \lambda}} \qquad \text{Equation 14}$$

A relationship between the effects of additives on thickening time may be expressed as polynomial as in equation 15. In equation 15, C is the concentration of the additive and a and b are polynomial coefficients.

$$TT_a \propto aC + bC^2 + \ldots \qquad \text{Equation 15}$$

A relationship between the effects of additives on thickening time may be expressed as polynomial as in equation 16. In equation 16, $\gamma_0$ is a potency below a threshold temperature beyond which the additive can undergo changes in orientation, shape, dissolution kinetics, dissociation tendency etc. and thus increase/decrease its potency as a function of temperature, $E_1$ and $E_2$ are polynomial coefficients, C is the concentration of the additive, and T is temperature.

$$TT_a \alpha e^{(\gamma_0 + E_1 T + E_2 T^2 + \ldots) \times C} \qquad \text{Equation 16}$$

A relationship between the additives and thickening time may be expressed as a function of concentration of additives as in equation 17.

$$TT_a \alpha e^{(\gamma_0 + \gamma_1 * S(C)) \times C} \qquad \text{Equation 17}$$

In Equation 17, S(C) may be a sigmoid function in concentration and C is concentration of additive expressed as by weight of water.

A relationship between the additives potency and concentration may be expressed as equation 18.

$$\gamma_{eff} = \gamma_0 + \frac{\gamma_1}{1 + e^{(C-C_0) \times \lambda}} \qquad \text{Equation 18}$$

In equation 18, $\lambda$ is a measure of how rapidly the potency changes due to changes in concentration. $C_0$ is the threshold concentration around which the potency changes. $\gamma_0$ and $\gamma_1$ determine the limits for potency.

When two or more additives are used together in the same cement slurry, there may be interactions between the additives. A relationship between the effects of additives on thickening time with interactions may be expressed as in equation 19. In equation 19, $\gamma_1$ is potency of the first additive, $c_1$ is the concentration of the first additive, $\gamma_2$ is potency of the second additive, $c_2$ is the concentration of the second additive, and $\gamma_{int}$ is potency of the interaction.

$$TT_a \propto e^{\gamma_1 c_1} \times e^{\gamma_2 c_2} \times e^{\gamma_{int} \frac{c_1}{c_1+c_2}} \qquad \text{Equation 19}$$

Another form of a relationship between the effects of additives on thickening time with interactions may be expressed as in equation 20.

$$TT_a \alpha e^{\gamma_1 C_1} \times e^{\gamma_2 C_2} \times e^{\gamma_{int} C_1 C_2} \times \ldots \qquad \text{Equation 20}$$

Using any equations 2-5 for $TT_b$, or any other thickening time model of blend $TT_b$, and any of equations 6-20 for $TT_a$ a number of models of thickening time (TT) may be derived. Some forms of the thickening time model may be described by equation 21-24.

$$TT = TT_b \times e^{\gamma c} \qquad \text{Equation 21}$$

$$TT = TT_b \times e^{\left(\gamma_0 - \gamma_1 * \frac{1}{1 + e^{(T-T_0) \times \lambda}}\right) \times c} \qquad \text{Equation 22}$$

$$TT = TT_b \times e^{\gamma_1 c_1} \times e^{\gamma_2 c_2} \times e^{\gamma_{int} c_1 c_2} \qquad \text{Equation 23}$$

$$TT = TT_b \times e^{\gamma_1 (f(c) * g(T) * P(P))} \times e^{\gamma_2 c_2} \qquad \text{Equation 24}$$

Figure 1:
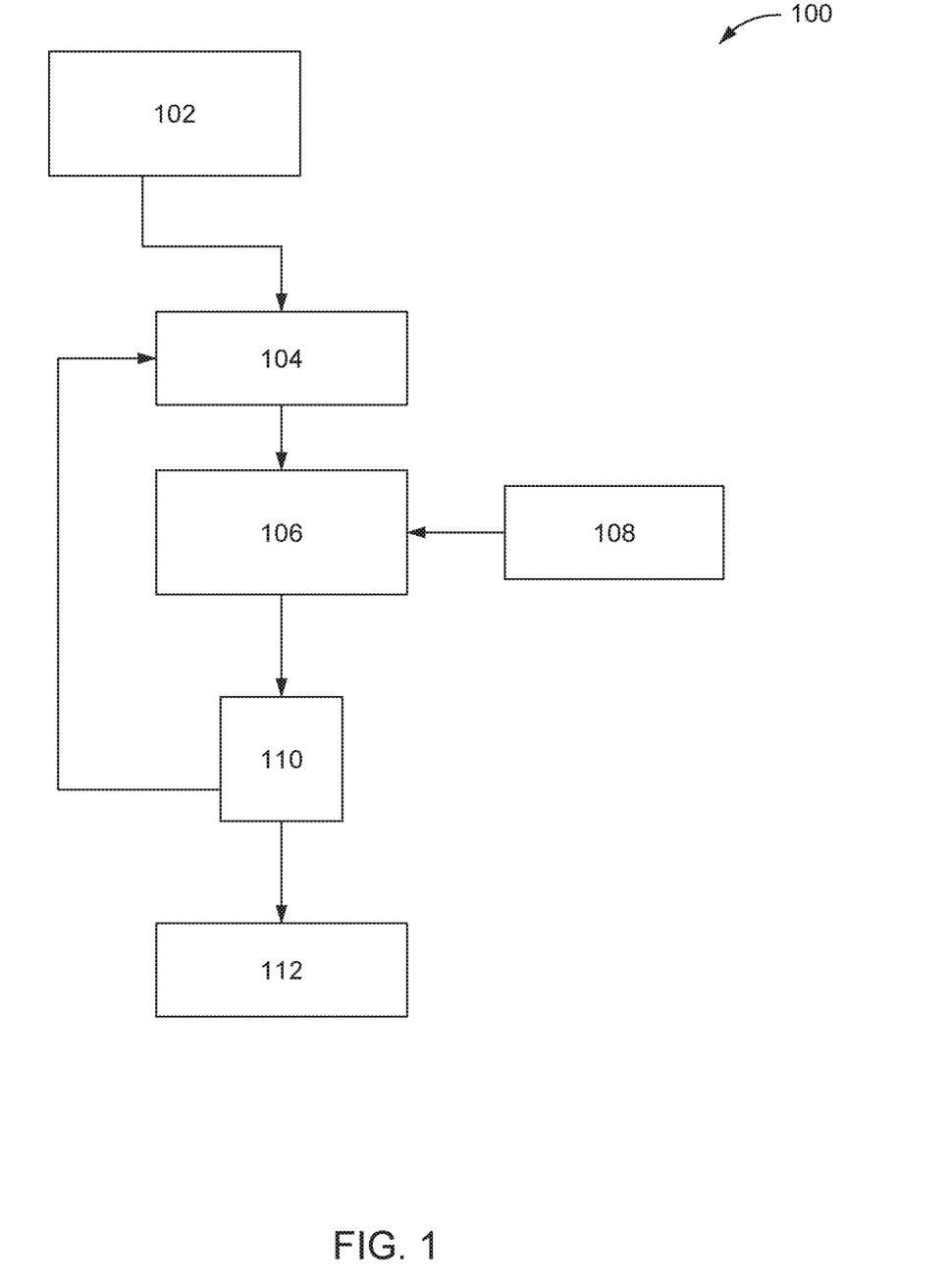
FIG. 1 illustrates a method to design for thickening time.

FIG. 1 illustrates a method 100 of using the models of thickening time discussed above. Method 100 may begin at step 102 where bulk material availability such as cement, supplementary cementitious materials, and cement additives available may be defined. Bulk material availability is typically location dependent whereby some geographic locations may have access to bulk materials that other geographic locations do not. Further, bulk materials such as mined materials and cements may vary across geographic locations due to differences in raw materials for manufacturing and manufacturing methods, as well as natural variations among deposits of mineable minerals across geographic locations. In step 102, engineering parameters such as fluid loss control requirements, rheology requirements, stability requirements, and thickening time requirement, as well as density and temperature. After defining materials available and engineering parameters, method 100 may proceed to step 104. In step 104, a proposed cement composition may be selected which may include cement components and mass fractions thereof, water and mass fraction thereof, and chemical additives and mass fractions thereof. The selecting of chemical additives and mass fractions thereof may be at least partially based on the fluid loss control, rheology, and stability. The cement components may include any one of a cement, a supplementary cementitious additive, an inert material, and/or a chemical additive that is available as defined in step 102. In step 106 the thickening time of the proposed cement composition may be calculated using any of the above thickening time models. For example, equations 22-24 may be used or any other models derived from the equations disclosed herein. In examples where cement components are selected in step 104 for which a potency or other model variable is not known, the unknown value may be calculated in step 108 using any of the above-mentioned methods. From step 106, method 100 may proceed to step 10 where the calculated thickening time from step 106 may be compared to the required thickening time defined in step 102. If the calculated thickening time is not within tolerance of the required thickening time, method 100 may proceed back to step 104 where a second proposed cement composition may be selected which may include disparate cement components and/or disparate mass fractions thereof and or chemical additives and components thereof. If the calculated thickening time is within tolerance of the required thickening time, method 100 may proceed to step 112. In step 112, the proposed cement composition may be prepared, and the thickening time measured to verify that the cement composition has the required thickening time.

Cement compositions described herein may generally include a hydraulic cement and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the cement composition in any amount suitable for a particular composition. Without limitation, the hydraulic cement may be included in the cement compositions in an amount in the range of from about 10% to about 80% by weight of dry blend in the cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement compositions.

The water may be from any source provided that it does not contain an excess of compounds that may undesirably affect other components in the cement compositions. For example, a cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement composition in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the cement composition such as the hydraulic cement and supplementary cementitious materials, for example.

As mentioned above, the cement composition may include supplementary cementitious materials. The supplementary cementitious material may be any material that contributes to the desired properties of the cement composition. Some supplementary cementitious materials may include, without limitation, fly ash, blast furnace slag, silica fume, pozzolans, kiln dust, and clays, for example.

The cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. A cement kiln dust may be added to the cement composition prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the cement composition in an amount suitable for a particular application.

In some examples, the cement composition may further include one or more of slag, natural glass, shale, amorphous silica, or metakaolin as a supplementary cementitious material. Slag is generally a granulated, blast furnace by-product from the production of cast iron including the oxidized impurities found in iron ore. The cement may further include shale. A variety of shales may be suitable, including those including silicon, aluminum, calcium, and/or magnesium. Examples of suitable shales include vitrified shale and/or calcined shale. In some examples, the cement composition may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the cement composition may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the cement composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the cement composition. For example, without limitation, one or more supplementary cementitious materials may be present in an amount of about 0.1% to about 80% by weight of the cement composition. For example, the supplementary cementitious materials may be present in an amount ranging between any of and/or including any of about 0.1%, about 10%, about 20%, about 30%, about 40%, about 50%, about 60%, about 70%, or about 80% by weight of the cement.

In some examples, the cement composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement composition, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set cement composition in an amount in the range of from about 10% to about 100% by weight of the cement composition, for example. In some examples, the hydrated lime may be present in an amount ranging between any of and/or including any of about 10%, about 20%, about 40%, about 60%, about 80%, or about 100% by weight of the cement composition. In some examples, the cementitious components present in the cement composition may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Lime may be present in the cement composition in several; forms, including as calcium oxide and or calcium hydroxide or as a reaction product such as when Portland cement reacts with water. Alternatively, lime may be included in the cement composition by amount of silica in the cement composition. A cement composition may be designed to have a target lime to silica weight ratio. The target lime to silica ratio may be a molar ratio, molal ratio, or any other equivalent way of expressing a relative amount of silica to lime. Any suitable target time to silica weight ratio may be selected including from about 10/90 lime to silica by weight to about 40/60 lime to silica by weight. Alternatively, about 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the cement composition. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the cement composition after storing but prior to the placement of a cement composition into a subterranean formation. In some examples, the cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement composition in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the cement composition may further include a set retarder. A broad variety of set retarders may be suitable for use in the cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement composition in an amount sufficient to delay the setting for a desired time. In some examples, the set retarder may be present in the cement composition in an amount in the range of from about 0.01% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

In some examples, the cement composition may further include an accelerator. A broad variety of accelerators may be suitable for use in the cement compositions. For example, the accelerator may include, but are not limited to, aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, or a combination thereof. In some examples, the accelerators may be present in the cement composition in an amount in the range of from about 0.01% to about 10% by weight of the cementitious materials. In specific examples, the accelerators may be present in an amount ranging between any of and/or including any of about 0.01%, about 0.1%, about 1%, about 2%, about 4%, about 6%, about 8%, or about 10% by weight of the cementitious materials.

Cement compositions generally should have a density suitable for a particular application. By way of example, the cement composition may have a density in the range of from about 8 pounds per gallon ("ppg") (959 kg/m$^3$) to about 20 ppg (2397 kg/m$^3$), or about 8 ppg to about 12 ppg (1437.  kg/m$^3$), or about 12 ppg to about 16 ppg (1917.22 kg/m$^3$), or about 16 ppg to about 20 ppg, or any ranges therebetween. Examples of the cement compositions may be foamed or unfoamed or may comprise other means to reduce their densities, such as hollow microspheres, low-density elastic beads, or other density-reducing additives known in the art.

The cement slurries disclosed herein may be used in a variety of subterranean applications, including primary and remedial cementing. The cement slurries may be introduced into a subterranean formation and allowed to set. In primary cementing applications, for example, the cement slurries may be introduced into the annular space between a conduit located in a wellbore and the walls of the wellbore (and/or a larger conduit in the wellbore), wherein the wellbore penetrates the subterranean formation. The cement slurry may be allowed to set in the annular space to form an annular sheath of hardened cement. The cement slurry may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a micro annulus).

Figure 2:
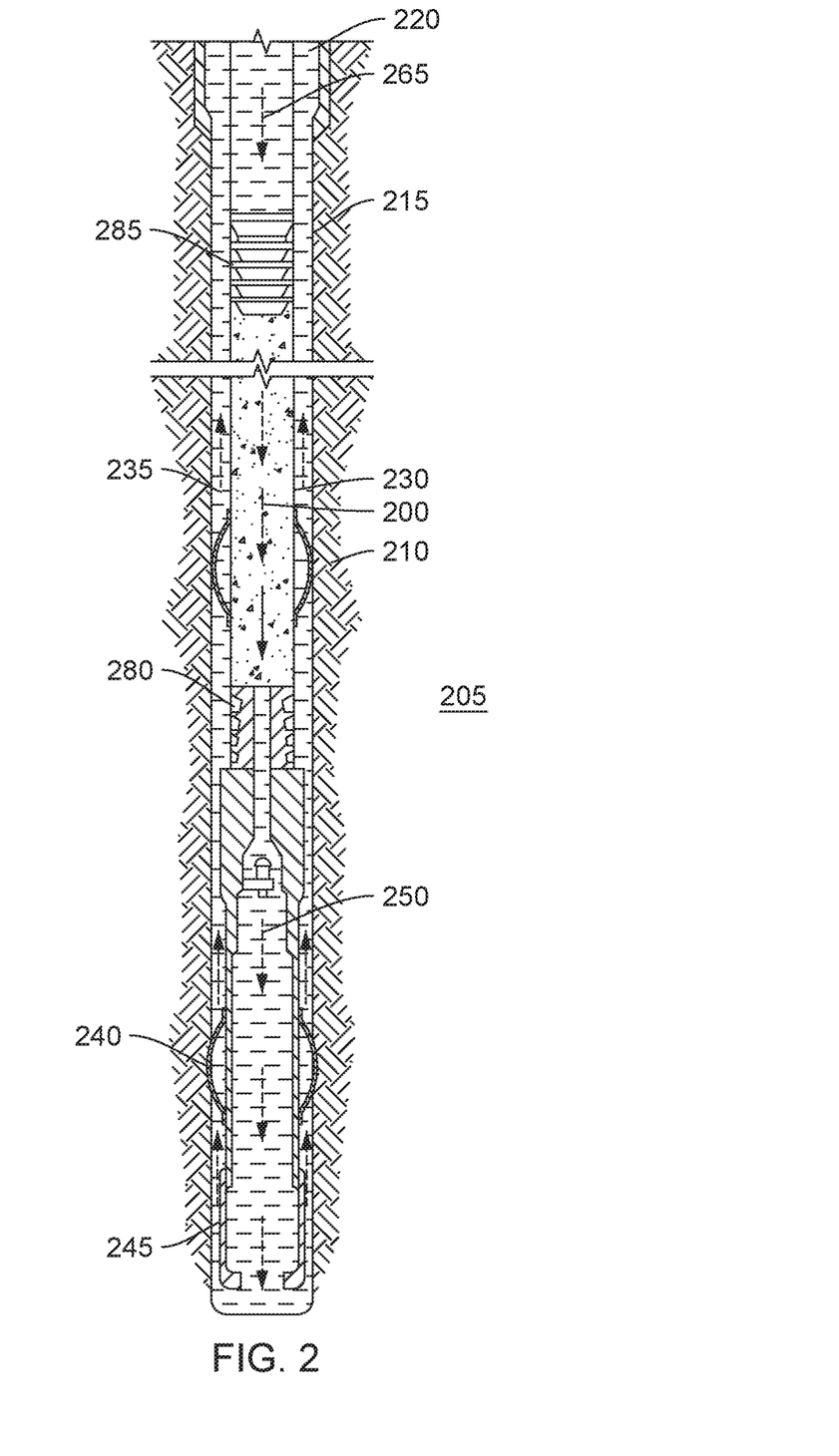
FIG. 2 illustrates introduction of a cement slurry into a wellbore.

Reference is now made to FIG. 2, illustrating use of a cement slurry 200. Cement slurry 200 may comprise any of the components described herein. Cement slurry 200 may be designed, for example, using the thickening time models describe herein. Cement slurry 200 may be placed into a subterranean formation 205 in accordance with example systems, methods and cement slurries. As illustrated, a wellbore 210 may be drilled into the subterranean formation 205. While wellbore 210 is shown extending generally vertically into the subterranean formation 205, the principles described herein are also applicable to wellbores that extend at an angle through the subterranean formation 205, such as horizontal and slanted wellbores. As illustrated, the wellbore 210 comprises walls 215. In the illustration, casing 230 may be cemented to the walls 215 of the wellbore 210 by cement sheath 220. In the illustration, one or more additional conduits (e.g., intermediate casing, production casing, liners, etc.), shown here as casing 230 may also be disposed in the wellbore 210. As illustrated, there is a wellbore annulus 235 formed between the casing 230 and the walls 215 of the wellbore 210. One or more centralizers 240 may be attached to the casing 230, for example, to centralize the casing 230 in the wellbore 210 prior to and during the cementing operation. The cement slurry 200 may be pumped down the interior of the casing 230. The cement slurry 200 may be allowed to flow down the interior of the casing 230 through the casing shoe 245 at the bottom of the casing 230 and up around the casing 230 into the wellbore annulus 235. The cement slurry 200 may be allowed to set in the wellbore annulus 235, for example, to form a cement sheath that supports and positions the casing 230 in the wellbore 210. While not illustrated, other techniques may also be utilized for introduction of the cement slurry 200. By way of example, reverse circulation techniques may be used that include introducing the cement slurry 200 into the subterranean formation 205 by way of the wellbore annulus 235 instead of through the casing 230. As it is introduced, the cement slurry 200 may displace other fluids 250, such as drilling fluids and/or spacer fluids that may be present in the interior of the casing 230 and/or the wellbore annulus 235. While not illustrated, at least a portion of the displaced fluids 250 may exit the wellbore annulus 235 via a flow line and be deposited, for example, in one or more retention pits. A bottom plug 255 may be introduced into the wellbore 210 ahead of the cement slurry 200, for example, to separate the cement slurry 200 from the fluids 250 that may be inside the casing 230 prior to cementing. After the bottom plug 255 reaches the landing collar 280, a diaphragm or other suitable device should rupture to allow the cement slurry 200 through the bottom plug 255. The bottom plug 255 is shown on the landing collar 280. In the illustration, a top plug 285 may be introduced into the wellbore 210 behind the cement slurry 200. The top plug 260 may separate the cement slurry 200 from a displacement fluid 265 and also push the cement slurry 200 through the bottom plug 255.

The following statements may describe certain embodiments of the disclosure but should be read to be limiting to any particular embodiment.

Statement 1. A method of designing a cement slurry comprising: (a) selecting at least a cement and concentration thereof, a water and concentration thereof, and one or more chemical additives and a concentration thereof such that a cement slurry formed from the cement, water, and the one or more chemical additives meet a density requirement; (b) calculating a thickening time of the cement slurry using a thickening time model; (c) comparing the thickening time of the cement slurry to a thickening time requirement, wherein steps (a)-(c) are repeated if the thickening time of the cement slurry does not meet or exceed the thickening time requirement, wherein each repeated step of selecting comprises selecting different concentrations and/or different chemical identities for the one or more chemical additives, cement, or water than previously selected, or step (d) is performed if the thickening time of the cement slurry meets or exceeds the thickening time requirement; and (d) preparing the cement slurry.

Statement 2. The method of statement 1 wherein the one or more chemical additives is selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives and combinations thereof.

Statement 3. The method of any of statements 1-2 wherein the one or more chemical additives is selected from the group consisting of cement set retarders, cement accelerators, and combinations thereof.

Statement 4. The method of statement 1 wherein the thickening time model comprises the following equation: $TT = TT_b \times e^{\gamma c}$ where TT is the thickening time, $TT_b$ is a thickening time model time of the cement, $\gamma$ is a potency of the chemical additive, and c is the concentration of the chemical additive.

Statement 5. The method of statement 1 wherein the thickening time model comprises the following equation:

$$TT = TT_b \times e^{\left(\gamma_0 - \gamma_1 * \frac{1}{1+e^{(T-T_0)\times\lambda}}\right)\times c}$$

where TT is the thickening time, $TT_b$ is a thickening time model of the cement, $\gamma_0$ and $\gamma_1$ are limits of potency, $T_0$ is a transition threshold temperature, $\Delta$ is a measure of potency change with respect to temperature, T is temperature, and c is a concentration of the chemical additive.

Statement 6. The method of statement 1 wherein the thickening time model comprises the following equation: $TT=TT_b \times e^{\gamma_1 C_1} \times e^{\gamma_2 C_2} \times e^{\gamma_{int} C_1 C_2}$ where TT is the thickening time, $TT_b$ is a thickening time model of the cement, $\gamma_1$ is potency of a first chemical additive, $c_1$ is a concentration of the first chemical additive, $\gamma_2$ is potency of a second chemical additive, $c_2$ is a concentration of the second chemical additive, and $\gamma_{int}$ is potency of an interaction between the first chemical additive and the second chemical additive.

Statement 7. A method comprising: providing a cement blend and a thickening time of the cement blend; preparing a slurry comprising the cement blend, water, and a chemical additive; measuring a thickening time of the slurry; and calculating a potency ($\gamma$) of the chemical additive using a thickening time model, the measured thickening time of the slurry, and the thickening time of the cement blend.

Statement 8. The method of statement 7 wherein the one or more chemical additives is selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives and combinations thereof.

Statement 9. The method of any of statements 7-8 wherein the one or more chemical additives is selected from the group consisting of cement set retarders, cement accelerators, and combinations thereof.

Statement 10. The method of any of statements 7-9 wherein the thickening time model comprises the following equation: $TT=TT_b \times e^{\gamma c}$ where TT is the thickening time, $TT_b$ is a thickening time model of the cement blend, $\gamma$ is a potency of the chemical additive, and c is the concentration of the chemical additive.

Statement 11. The method of statement 7 wherein the thickening time model comprises the following equation:

$$TT = TT_b \times e^{\left(\gamma_0 - \gamma_1 * \frac{1}{1+e^{(T-T_0) \times \lambda}}\right) \times c}$$

where TT is the thickening time, $TT_b$ is a thickening time model of the cement blend, $\gamma_0$ and $\gamma_1$ are limits of potency, $T_0$ is a transition threshold temperature, $\Delta$ is a measure of potency change with respect to temperature, T is temperature, and c is a concentration of the chemical additive.

Statement 12. The method of statement 7 wherein thickening time model comprises the following equation: $TT=TT_b \times e^{\gamma_1 C_1} \times e^{\gamma_2 C_2} \times e^{\gamma_{int} C_1 C_2}$ where TT is the thickening time, $TT_b$ is a thickening time model of the cement blend, $\gamma_1$ is potency of a first chemical additive, $c_1$ is a concentration of the first chemical additive, $\gamma_2$ is potency of a second chemical additive, $c_2$ is a concentration of the second chemical additive, and $\gamma_{int}$ is potency of an interaction between the first chemical additive and the second chemical additive.

Statement 13. The method of statement 7 further comprising: (a) selecting a mass fraction of a the cement blend, a mass fraction of water, and a mass fraction of the chemical additive such that a second cement slurry formed from the cement blend and mass fraction thereof, the chemical additive and mass fraction thereof, and the water and mass fraction thereof meet a density requirement; (b) calculating a thickening time of the second cement slurry using the thickening time model; (c) comparing the thickening time of the second cement slurry to a thickening time requirement, wherein steps (a)-(c) are repeated if the thickening time of the second cement slurry does not meet or exceed the thickening time requirement, wherein each repeated step of selecting comprises selecting different concentrations and/or different chemical identities for the one or more chemical additives, cement, or water than previously selected, or step (d) is performed if the thickening time of the second cement slurry meets or exceeds the thickening time requirement; and (d) preparing the cement slurry.

Statement 14. The method of statement 13 wherein the thickening time model comprises the following equation: $TT=TT_b \times e^{\gamma c}$ where TT is the thickening time, $TT_b$ is a thickening time model of the cement, $\gamma$ is a potency of the chemical additive, and c is the concentration of the chemical additive in the second cement slurry.

Statement 15. The method of statement 13 wherein the thickening time model comprises the following equation:

$$TT = TT_b \times e^{\left(\gamma_0 - \gamma_1 * \frac{1}{1+e^{(T-T_0) \times \lambda}}\right) \times c}$$

where TT is the thickening time of the second cement slurry, $TT_b$ is a thickening time model of the cement, $\gamma_0$ and $\gamma_1$ are limits of potency, $T_0$ is a transition threshold temperature, $\lambda$ is a measure of potency change with respect to temperature, T is temperature, and c is a concentration of the chemical additive in the second cement slurry.

Statement 16. The method of statement 13 wherein the thickening time model comprises the following equation:

$$TT = TT_b \times e^{\gamma_1 c_1} \times e^{\gamma_2 c_2} \times e^{\gamma_{int} c_1 c_2}$$

where TT is the thickening time of the second cement slurry, $TT_b$ is a thickening time model of the cement, $\gamma_1$ is potency of a first chemical additive, $c_1$ is a concentration of the first chemical additive in the second cement slurry, $\gamma_2$ is potency of a second chemical additive, $c_2$ is a concentration of the second chemical additive in the second cement slurry, and $\gamma_{int}$ is potency of an interaction between the first chemical additive and the second chemical additive.

Statement 17. A method comprising: defining a thickening time requirement and a density requirement; selecting a mass fraction of a cement blend, a mass fraction of water, and a mass fraction of a chemical additive such that a cement slurry formed from the cement blend and mass fraction thereof, the chemical additive and mass fraction thereof, and the water and mass fraction thereof meet the density requirement, and wherein the selecting further comprises using a thickening time model to select the mass fraction of the cement blend, the mass fraction of water, and the mass fraction of the chemical additive meets or exceeds the thickening time requirement; and preparing the cement slurry.

Statement 18. The method of statement 17 wherein the thickening time model comprises the following equation: $TT=TT_b \times e^{\gamma c}$ where TT is the thickening time, $TT_b$ is a thickening time model of the cement, $\gamma$ is a potency of the chemical additive, and c is the concentration of the chemical additive.

Statement 19. The method of statement 17 wherein the thickening time model comprises the following equation:

$$TT = TT_b \times e^{\left(\gamma_0 - \gamma_1 * \frac{1}{1+e^{(T-T_0)\times \lambda}}\right) \times c}$$

where TT is the thickening time, $TT_b$ is a thickening time model of the cement, $\gamma_0$ and $\gamma_1$ are limits of potency, $T_0$ is a transition threshold temperature, $\lambda$ is a measure of potency change with respect to temperature, T is temperature, and c is a concentration of the chemical additive.

Statement 20. The method of statement 17 wherein the thickening time model comprises the following equation: $TT=TT_b \times e^{\gamma_1 C_1} \times e^{\gamma_2 C_2} \times e^{\gamma_{int} C_1 C_2}$ where TT is the thickening time, $TT_b$ is a thickening time model of the cement, $\gamma_1$ is potency of a first chemical additive, $c_1$ is a concentration of the first chemical additive, $\gamma_2$ is potency of a second chemical additive, $c_2$ is a concentration of the second chemical additive, and $\gamma_{int}$ is potency of an interaction between the first chemical additive and the second chemical additive.

Example

Cement slurries were prepared using various cement additives as shown in Table 1. The models of thickening time developed above were used to calculate γ for the cement additives. The equation that was used to fit for the potency values is shown in the third column.

TABLE 1

| Additive | Potency | Equation |
| --- | --- | --- |
| Lignosulfonate | 2.2007 | 9 |
| Acrylic Acid Copolymer 1 | 2.2543 | 9 |
| Sugar | 2.4493 | 9 |
| CaCl2 | −0.1744 | 9 |
| Modified Lignosulfonate | $\gamma_0$ = 1.5358, $\gamma_1$ = 0.47655, T_0 = 140, $\lambda$ = 0.8844 | 13 |
| Acrylic Acid Copolymer 2 | $\gamma_A$ = 0.0, $\gamma_B$ = 1.17, $\gamma_{int}$ = 4.13 | 20 |

Figure 3:
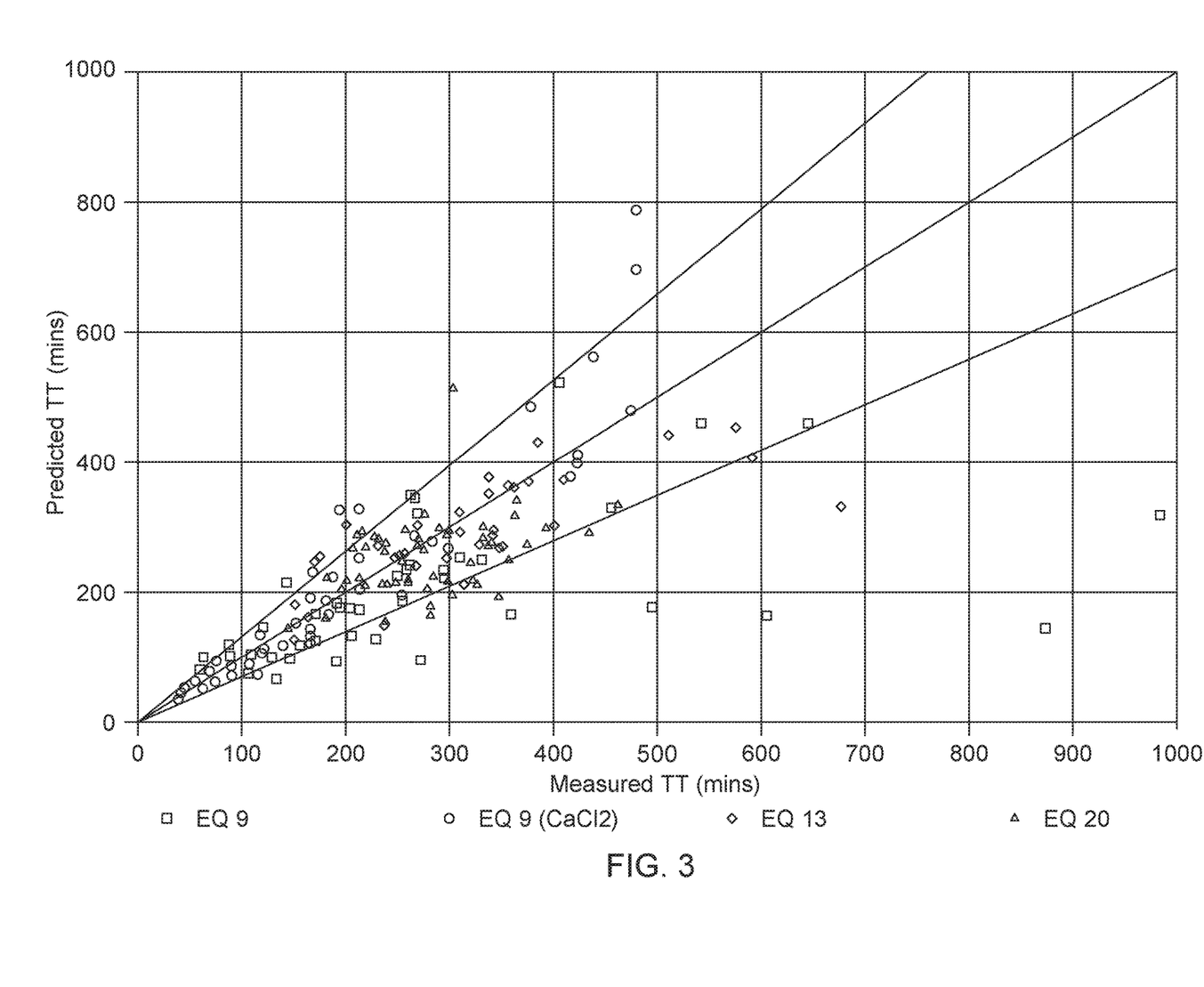
FIG. 3 is a parity plot showing results of a thickening time test.

Acrylic acid copolymer 1 is 2-Acrylamido-2-methylpropane sulfonic acid and acrylic acid copolymer and acrylic acid copolymer 2 is organic acid and 2-Acrylamido-2-methylpropane sulfonic acid copolymer. The models developed above in equations 8, 12, and 20 were used to predict thickening times of cement compositions. FIG. 3 is a parity plot of the measured thickening times of the cement compositions and the predicted thickening time of the cement compositions. The parity plot shows a good fit for the measured thickening time to the predicted thickening time.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of designing a cement slurry comprising:
   (a) selecting at least a cement and concentration thereof, a water and concentration thereof, and one or more chemical additives and a concentration thereof such that a cement slurry formed from the cement, water, and the one or more chemical additives meet a density requirement;
   (b) calculating a thickening time of the cement slurry using a thickening time model, wherein the thickening time model comprises an equation relating the thickening time of the cement slurry as a function of the concentration of the cement, the concentration of the one or more chemical additives, and a potency of the one or more chemical additives;
   (c) comparing the thickening time of the cement slurry to a thickening time requirement, wherein steps (a)-(c) are repeated if the thickening time of the cement slurry does not meet or exceed the thickening time requirement, wherein each repeated step of selecting comprises selecting different concentrations and/or different chemical identities for the one or more chemical additives, cement, or water than previously selected, or step (d) is performed if the thickening time of the cement slurry meets or exceeds the thickening time requirement; and (d) preparing the cement slurry.

2. The method of claim 1 wherein the one or more chemical additives is selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives and combinations thereof.

3. The method of claim 1 wherein the one or more chemical additives is selected from the group consisting of cement set retarders, cement accelerators, and combinations thereof.

4. The method of claim 1 wherein the thickening time model comprises the following equation:

$$TT=TT_b \times e^{\gamma c}$$

where TT is the thickening time, $TT_b$ is a thickening time model time of the cement, $\gamma$ is the potency of the chemical additive, and c is the concentration of the chemical additive.

5. The method of claim 1 wherein the thickening time model comprises the following equation:

$$TT = TT_b \times e^{\left(\gamma_0 - \gamma_1 * \frac{1}{1+e^{(T-T_0)\times\lambda}}\right) \times c}$$

where TT is the thickening time, $TT_b$ is a thickening time model of the cement, $\gamma_0$ and $\gamma_1$ are limits of potency, $T_0$ is a transition threshold temperature, $\lambda$ is a measure of potency change with respect to temperature, T is temperature, and c is a concentration of the chemical additive.

6. The method of claim 1 wherein the thickening time model comprises the following equation:

$$TT=TT_b \times e^{\gamma_1 C_1} \times e^{\gamma_2 C_2} \times e^{\gamma_{int} C_1 C_2}$$

where TT is the thickening time, $TT_b$ is a thickening time model of the cement, $\gamma_1$ is potency of a first chemical additive, $c_1$ is a concentration of the first chemical additive, $\gamma_2$ is potency of a second chemical additive, $c_2$ is a concentration of the second chemical additive, and $\gamma_{int}$ is potency of an interaction between the first chemical additive and the second chemical additive.

7. A method comprising:
providing a cement blend and a thickening time of the cement blend;
preparing a cement slurry comprising the cement blend, water, and a chemical additive;
measuring a thickening time of the cement slurry; and
calculating a potency ($\gamma$) of the chemical additive using a thickening time model, the measured thickening time of the slurry, and the thickening time of the cement blend, wherein the thickening time model comprises an equation relating the thickening time of the cement slurry as a function of the thickening time of the cement blend, a concentration of the cement in the cement slurry, a concentration of the chemical additive in the cement slurry, and the potency of the chemical additive.

8. The method of claim 7 wherein the one or more chemical additives is selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives and combinations thereof.

9. The method of claim 7 wherein the one or more chemical additives is selected from the group consisting of cement set retarders, cement accelerators, and combinations thereof.

10. The method of claim 7 wherein the thickening time model comprises the following equation:

$$TT=TT_b \times e^{\gamma c}$$

where TT is the thickening time, $TT_b$ is a thickening time model of the cement blend, $\gamma$ is the potency of the chemical additive, and c is the concentration of the chemical additive.

11. The method of claim 7 wherein the thickening time model comprises the following equation:

$$TT = TT_b \times e^{\left(\gamma_0 - \gamma_1 * \frac{1}{1+e^{(T-T_0)\times\lambda}}\right) \times c}$$

where TT is the thickening time, $TT_b$ is a thickening time model of the cement blend, $\gamma_0$ and $\gamma_1$ are limits of potency, $T_0$ is a transition threshold temperature, $\lambda$ is a measure of potency change with respect to temperature, T is temperature, and c is a concentration of the chemical additive.

12. The method of claim 7 wherein thickening time model comprises the following equation:

$$TT=TT_b \times e^{\gamma_1 C_1} \times e^{\gamma_2 C_2} \times e^{\gamma_{int} C_1 C_2}$$

where TT is the thickening time, $TT_b$ is a thickening time model of the cement blend, $\gamma_1$ is potency of a first chemical additive, $c_1$ is a concentration of the first chemical additive, $\gamma_2$ is potency of a second chemical additive, $c_2$ is a concentration of the second chemical additive, and $\gamma_{int}$ is potency of an interaction between the first chemical additive and the second chemical additive.

13. The method of claim 7 further comprising:
(a) selecting a mass fraction of the cement blend, a mass fraction of water, and a mass fraction of the chemical additive such that a second cement slurry formed from the cement blend and mass fraction thereof, the chemical additive and mass fraction thereof, and the water and mass fraction thereof meet a density requirement;
(b) calculating a thickening time of the second cement slurry using the thickening time model;
(c) comparing the thickening time of the second cement slurry to a thickening time requirement, wherein steps (a)-(c) are repeated if the thickening time of the second cement slurry does not meet or exceed the thickening time requirement, wherein each repeated step of selecting comprises selecting different concentrations and/or different chemical identities for the one or more chemical additives, cement, or water than previously selected, or step (d) is performed if the thickening time of the second cement slurry meets or exceeds the thickening time requirement; and
(d) preparing the cement slurry.

14. The method of claim 13 wherein the thickening time model comprises the following equation:

$$TT = TT_b \times e^{\gamma c}$$

where TT is the thickening time, $TT_b$ is a thickening time model of the cement, $\gamma$ is the potency of the chemical additive, and c is the concentration of the chemical additive in the second cement slurry.

15. The method of claim 13 wherein the thickening time model comprises the following equation:

$$TT = TT_b \times e^{\left(\gamma_0 - \gamma_1 * \frac{1}{1+e^{(T-T_0)\times\lambda}}\right) \times c}$$

where TT is the thickening time of the second cement slurry, $TT_b$ is a thickening time model of the cement, $\gamma_0$ and $\gamma_1$ are limits of potency, $T_0$ is a transition threshold temperature, $\lambda$ is a measure of potency change with respect to temperature, T is temperature, and c is a concentration of the chemical additive in the second cement slurry.

16. The method of claim 13 wherein the thickening time model comprises the following equation:

$$TT = TT_b \times e^{\gamma_1 C_1} \times e^{\gamma_2 C_2} \times e^{\gamma_{int} C_1 C_2}$$

where TT is the thickening time of the second cement slurry, $TT_b$ is a thickening time model of the cement, $\gamma_1$ is potency of a first chemical additive, $c_1$ is a concentration of the first chemical additive in the second cement slurry, $\gamma_2$ is potency of a second chemical additive, $c_2$ is a concentration of the second chemical additive in the second cement slurry, and $\gamma_{int}$ is potency of an interaction between the first chemical additive and the second chemical additive.

17. A method comprising:
defining a thickening time requirement and a density requirement;
selecting a mass fraction of a cement blend, a mass fraction of water, and a mass fraction of a chemical additive such that a cement slurry formed from the cement blend and mass fraction thereof, the chemical additive and mass fraction thereof, and the water and mass fraction thereof meet the density requirement, and wherein the selecting further comprises using a thickening time model to select the mass fraction of the cement blend, the mass fraction of water, and the mass fraction of the chemical additive meets or exceeds the thickening time requirement, wherein the thickening time model comprises an equation relating the thickening time of the cement slurry as a function of the concentration of the cement in the cement slurry, the concentration of the chemical additive, and a potency of the chemical additive; and preparing the cement slurry.

18. The method of claim 17 wherein the thickening time model comprises the following equation:

$$TT = TT_b \times e^{\gamma c}$$

where TT is the thickening time, $TT_b$ is a thickening time model time of the cement, $\gamma$ is a potency of the chemical additive, and c is the concentration of the chemical additive.

19. The method of claim 17 wherein the thickening time model comprises the following equation:

$$TT = TT_b \times e^{\left(\gamma_0 - \gamma_1 * \frac{1}{1+e^{(T-T_0)\times\lambda}}\right) \times c}$$

where TT is the thickening time, $TT_b$ is a thickening time model of the cement, $\gamma_0$ and $\gamma_0$ are limits of potency, $T_0$ is a transition threshold temperature, $\lambda$ is a measure of potency change with respect to temperature, T is temperature, and c is a concentration of the chemical additive.

20. The method of claim 17 wherein the thickening time model comprises the following equation:

$$TT = TT_b \times e^{\gamma_1 C_1} \times e^{\gamma_2 C_2} \times e^{\gamma_{int} C_1 C_2}$$

where TT is the thickening time, $TT_b$ is a thickening time model of the cement, $\gamma_1$ is potency of a first chemical additive, $c_1$ is a concentration of the first chemical additive, $\gamma_2$ is potency of a second chemical additive, $c_2$ is a concentration of the second chemical additive, and $\gamma_{int}$ is potency of an interaction between the first chemical additive and the second chemical additive.

* * * * *